United States Patent [19]

Donntag et al.

[11] Patent Number: 5,181,717
[45] Date of Patent: Jan. 26, 1993

[54] INFLATED SPORTS BALL

[75] Inventors: Jean-Marie Donntag, Kehl; Jacques Casper, Gottenhouse, both of France

[73] Assignee: Adidas Sarragan France, Landersheim, France

[21] Appl. No.: 488,284

[22] Filed: Mar. 2, 1990

[30] Foreign Application Priority Data

Mar. 3, 1989 [FR] France .................... 89 02828

[51] Int. Cl.⁵ .............................................. A63B 41/08
[52] U.S. Cl. ......................... 273/58 BA; 273/65 ED; 273/65 EE; 273/DIG. 8; 264/257; 264/313; 264/321
[58] Field of Search ......... 273/DIG. 8, 65 E, 65 ED, 273/58 B, 58 BA, 65 EE, 65 R, 58 R

[56] References Cited

U.S. PATENT DOCUMENTS

| | | | |
|---|---|---|---|
| 1,614,853 | 1/1927 | Schwartz | 273/61 R |
| 3,112,521 | 12/1963 | Ward | 18/5 |
| 3,185,476 | 5/1965 | Fechner | 273/DIG. 8 |
| 4,462,590 | 7/1984 | Mitchell | 273/65 E |

FOREIGN PATENT DOCUMENTS

| | | |
|---|---|---|
| 411475 | 10/1935 | Belgium . |
| 2125758 | 12/1972 | Fed. Rep. of Germany ........ 273/65 ED |
| 1488920 | 6/1967 | France . |
| 2215249 | 8/1974 | France . |
| 2572674 | 5/1986 | France . |

*Primary Examiner*—George J. Marlo
*Attorney, Agent, or Firm*—Cushman, Darby & Cushman

[57] ABSTRACT

An inflated bladder-type sports or leisure ball, e.g., a football, having as a cover, an external layer of polyurethane or polyurethane-polyurea foam with compact integral skin. The thickness of the covering layer is between about 1.5 and about 5 mm, whereas the thickness of the compact integral skin is between about 0.5 and about 2 mm. The ball may be of a hand-sewn, laminated or overmolded type. A process for manufacturing such balls is disclosed.

12 Claims, 3 Drawing Sheets

INFLATED SPORTS BALL

BACKGROUND OF THE INVENTION

The present invention relates to inflated bladder-type sports balls, including those used for leisure activity, and particularly, to ones having a covering of foamed plastic material with an integral, external non-foamed skin.

Inflated bladder-type sports balls made presently belong to two main categories: ones which have an external cover or layer constituted of hand-sewn elements, for example, of leather or a synthetic material, such as polyurethane, and those having a cover which is not obtained by manual sewing, but by molding in place an external layer, by manual or mechanical means (e.g., with a spray gun for a composition comprising polyurethane). The balls of the second category are, in contrast with those of the first category, often called non-hand-sewn balls.

In other respects, the conventional technique for manufacturing balls is based on the use of an inflated internal bladder or bag, generally made of rubber, which, in most cases, is covered by a textile component made out of fibres or filaments made of a natural or a synthetic material, these fibers or filaments being, for example, progressively wound on the bladder. In order to ensure the integrity of the textile layer, it is combined with a composition, which is generally vulcanizable or curable, especially with a natural or synthetic rubber. The final external coating is then applied on this composition.

Another type of ball is also known in the art, which does not include any bladder, but has an equivalent internal carcass obtained directly from a polymeric synthetic composition, which can be formed in a conventional manner, e.g., by molding and, more particularly, by rotary molding (e.g., rotary slush casting) technique in which centrifugal forces produce rotational dispersion of the polymeric composition and the formation of a hollow shell, with a more or less regular wall which is more or less dimensionally stable.

The methods, which have been mentioned hereinabove, are well known to the persons skilled in the art and it is, therefore, not necessary to describe them in more detail.

A person skilled in the art would tend to try to improve the characteristics of conventional balls and to simplify their manufacture. It is especially important to obtain balls which have a "behaviour", or response, giving full satisfaction to the user, having a long, useful life and which can be manufactured more economically than the conventional balls.

Foam or sponges with integral skin are already known in the automotive industry, the furniture industry and the shoe industry. Also, foams or sponges with a semirigid or flexible integral skin are known, but their characteristics are not adapted for the manufacture of balls because they have a reduced resilient memory and too high a glass-transition temperature (generally over −40° C.).

It has been suggested in the prior art to use polyurethane foams for manufacturing balls.

For example, French Patent 2,572,674 discloses the overmolding of an internal bladder or carcass, obtained by rotary molding, by injecting around the bladder or carcass, a polyurethane composition which is provided in the form of a polymerizable liquid. This French patent teaches a ball-manufacturing process providing balls with an external layer that has the form of a cellular material, but it does not disclose at all a ball cover that includes a foam with an integral skin. On the contrary, when considering the disclosed manufacturing conditions, it appears that the polymerizable liquid is injected under low pressure and the mold is heated. These practical indications would not allow one to obtain a foam with an integral skin, and especially such a foam having the physical characteristics and parameters which are indispensable for manufacturing balls when using a foam with integral skin.

U.S. Pat. No. 1,614,853 teaches the manufacture of tennis balls, in which the internal carcass of the ball is surrounded by a thin cover in cellular rubber which may include a skin resulting from a molding step. For the final formation of the ball, the pieces cut out from the cover may be cemented or glued on the internal carcass. This patent does not disclose use of polyurethane or polyurethane-polyurea foam or sponge with an integral skin, and, especially does not give any indication about the physical characteristics and parameters to be complied with for manufacturing larger balls, such as footballs, rather than tennis balls.

U.S. Pat. No. 4,462,590 relates to the manufacture of balls, especially of footballs (for playing American football), having an external part or cover and a padding layer which is said to improve the "grip" provided to the user of the ball, and which layer may be constituted of cellular polyurethane. The disclosure of this last-mentioned patent, also relates to the construction of the internal bladder of the ball. This patent discloses, therefore, a ball, especially a football, with an external layer made out of two distinct elements, i.e., the external cover proper and the padding layer.

Belgian Patent 411,755 describes the manufacture of balls made of leather, starting from separate panels which are sewn. This patent has for an object provision of a ball having a structure with a small tongue allowing a user to reach more easily the internal portion of the ball.

French Patent 1,488,920 describes a conventional method for manufacturing balls of a type having a bladder, more particularly basketballs. The pieces of the external cover, which are made of vulcanized rubber, may be obtained starting from plates.

U.S. Pat. No. 3,112,521 discloses a very sophisticated apparatus for manufacturing golf balls. It is particularly concerned with means for exactly locating the core of the golf ball inside a mold cavity, so as to allow the filling of the cavity with a composition of liquid polyurethane, thereby forming a polyurethane layer of uniform thickness at the outer periphery of the core of the ball.

French Patent 2,215,249 discloses the manufacture of panelled balls, by cutting the panels which provide the exterior of the ball from preconstructed sheet material having a compounded structure.

SUMMARY OF THE INVENTION

The present invention provides an inflated bladder-type of sports ball (including one having an equivalent rotary molded lining) having a covering of foamed plastic material made of polyurethane or a combination of polyurethane and polyurea, which covering has an integral external non-foamed skin made of the same plastic material.

The foamed layer is microalveolate or microcellular at its core; its skin is compact; and between the core and the skin, the foamed layer has an intermediate zone in which the cells are progressively smaller, less elongated, and fewer in number towards the skin.

The cover may be hand-sewn, or non-hand sewn (e.g., laminated or over-molded).

The ball of the invention may be made in various quality grades, e.g., for use in competitive sports, or for use in leisure games by children, for indoor sports, and for outdoor sports.

The thickness of the compact surface skin preferably is in the range of about 0.5 to about 2 mm, and more, preferably between about 0.5 and about 1 mm. The total thickness of the external skin preferably varies between about 1.5 and about 5 mm and most preferably is about 1.5 to about 3 mm.

The mean density of the compact skin may, in general, vary between 0.9 and 1.2 $g/cm^3$, whereas the density of the zone constituting the microcellular core is about 0.3 to 0.9 $g/cm^3$. Accordingly, the density of the zone near the surface is about 2.5 to 3 times the density of the microcellular zone. The average density of the external layer varies between about 0.4 and about 0.6 $g/cm^3$.

For the balls intended for the practice of outdoor sports, it is important that the microcellular structure includes pores or cells which communicate only very slightly between themselves and which are even preferably closed in their great majority. This allows one to maintain the weight of the ball even on a wet or very wet playing field, because, due to its structure with pores or cells which are mostly closed, there exists only a very slight water absorption propensity or no water absorption propensity at all, a feature which allows one to keep practically constant the weight of the ball. The person of ordinary skill in the art can be expected to be familiar with ways and means for obtaining such a result, as will be specified hereinafter.

In general, it is not desirable to increase excessively the thickness of the compact surface skin. In many cases, especially for footballs, it is preferable to limit the thickness of this compact skin to about 1 mm, because, with larger thicknesses, it has been found that the external layer becomes less flexible and less elastic, thereby having a disadvantageous influence on the general response of the ball.

Particularly interesting results have been obtained by manufacturing the external cover of the balls as a foam layer with integral skin, having a total thickness of about 2 mm with a compact skin of about 0.5 mm thickness. The physical characteristics which follow have shown to be the best ones:
average density 0.4 to 0.6 $g/cm^3$
Shore hardness, scale A: 30 to 65,
slit started along the length: higher than 5 daN/cm, preferably higher than 10 da N/cm,
slit started across: higher than 5 daN/cm, preferably higher than 10 daN/cm,
DIN abrasion with a load of 5N:150 to 250 mm,
static capture of water by free slices: 2 to 20%.

The modulus of elasticity of the compact skin may vary between about 3.75 $N/mm^2$ and about 6 $N/mm^2$, whereas in the portion or zone of the foam constituting the core, the modulus of elasticity is between about 1 $N/mm^2$ and 2 $N/mm^2$. In general, the modulus of elasticity of the zone near the surface (compact skin) is 1.5 to 2 times higher than in the zone of microcellular foam.

The physico-mechanical characteristics have been determined, after recut of a test plate, on samples having 3 mm thickness with a compact skin on a single side or face.

The present invention allows one to obtain any type of ball, i.e., one having a round or other shape, for example, an oval shape (rugby ball). It allows one also to manufacture a ball of any type, i.e., a hand-sewn, laminated or overmolded ball.

Therefore, according to one preferred embodiment, the present invention has for an object, the provision of hand-sewn balls having an external cover formed by panels which are assembled and hand-sewn, such balls being characterized by the fact that the panels include an external layer made of foamed plastic material with integral skin, as defined hereinabove, the integral skin being on the outer side and the internal microcellular zone being associated to a complex of technical fabrics. In this type of ball, the optimal value of the thickness of the compact layer or integral skin is less than 1 mm, for example, about 0.5 to about 1 mm.

According to another embodiment, it is an object of the present invention to provide laminated balls having an external coating constituted by laminated panels, these balls being characterized by the fact that these panels include an external layer of foam with integral skin, as defined hereinabove, the skin being directed towards the outside, whereas the internal microcellular zone is directly applied on an internal carcass. The thickness of the compact skin may be slightly higher and reach, e.g., about 1.0 mm; the internal carcasses which have given the best results are constituted, as it is known, of a bladder provided with a filamentary coating manufactured as an integral shell, for example, by the above-mentioned rotary molding technique.

According to a further embodiment, it is an object of the present invention to provide overmolded balls having an external coating obtained by overmolding a carcass, such balls being characterized by the fact that the coating includes an external layer provided as a foamed plastic layer with an integral skin, as defined hereinabove, this external layer being directed outwardly. In this type of ball, the thickness of the compact skin may vary between about 0.5 and about 1.5 mm. The carcass may be constituted of a bladder surrounded by filamentary coating or be manufactured as a single sheet, for example, by the technique of rotary molding.

For embodying the invention, a foam with integral skin made of polyurethane or polyurethane-polyurea, having the above-mentioned characteristics is used. The polyurethane-polyurea foams are mostly preferred, because a person of ordinary skill in the art has many possibilities for selecting the components of such foams as well as their operation conditions, which allow one to obtain the products having the desired characteristics. In the following description, precise indications and examples are given illustrating how foams satisfying the demands of the invention may be formulated and realized. It is known that, generally, the chemical system for producing polyurethane foams includes two essential components, namely: a polyol, i.e., a product having active hydroxyl (OH) groups, and an isocyanate, i.e., a component having reactive NCO groups. The polyol may be of the polyester-polyol or polyether-polyol type. In the first case, the polyol is obtained by polycondensation of a di-or polycarboxylic acid on a compound having hydroxyl groups, as a diol and/or a triol. The polyether-polyols are obtained by polymerization starting from ethylene oxide and/or propylene oxide. In both cases, i.e., of polyester-polyol or polyether-polyol, this component contains hydroxyl groups capable of reacting with the isocyanate groups of the second component.

For the second component, it is, in principle, possible to use any isocyanate, allowing one to obtain, by reaction with the first polyol component, the desired products. However, it is preferable to use an isocyanate prepolymer, i.e., an isocyanate which has already partially reacted with a polyester-polyol or a polyether-polyol. Such isocyanate prepolymers contain a well-defined proportion of free NCO groups which have, for an object to react with the polyol component, this reaction allowing one to obtain urethane or urethane/urea groups. Accordingly, for the purposes of the invention, it is preferable to use such a prepolymer with NCO endings.

Because it is essential to obtain a foam with integral skin, a person skilled in the art will easily understand that, with a formulation having as a base, a polyol-isocyanate, it is also necessary to use other components or means allowing one to obtain such a foam. An indispensable component is an expansion agent capable of forming cells in the bulk of the microcellular material. Any such convenient agent may be used, either in the gaseous condition or in a condition capable of forming a gas inside the mass of reactional mixture. It is generally this last condition which is preferred. For example, one may use distilled water, which is capable of reacting with the isocyanate groups for forming gaseous carbon dioxide. Excellent results have been obtained with fluorocarbon compounds, e.g., those available on the market under the trade name "FREON", in particular, of the R 11 and R 123 type, this last one having no detrimental action on the environment.

For obtaining the integral skin which is desirable, one may use any components and/or means known for this purpose by the persons skilled in the art. A first means comprises controlling, i.e., modifying, the reaction speed of the polyol and of the isocyanate by using a catalyst. Among the catalysts, the best results are obtained with amines, more particularly, with tertiary amines. It is also possible to use organometallic compounds, for example, those having tin as the metal in their composition.

It is also usual in the technique for manufacturing polyurethane forms to add to the base formulation chain-lengthening agents which allow one to modify, in the desired way, the physical properties of the foam so as to obtain the values which have been previously mentioned. As examples of chain-lengthening agents, one may cite compounds containing hydroxyl groups which may react with isocyanate groups, such compounds being, for example, chosen among the diols, as well as compounds including reactive amine groups, e.g., diamines.

The person skilled in the art knows that one may also use components having a function to stabilize the foam and, therefore, to control the dimension of the cells. Generally speaking, silicone oils, acting as tensio-active agents may be used. On the other hand, the composition, which is capable of foaming, may contain various other secondary components, such as antioxidants, stabilizers preventing the degradation under the influence of radiations (e.g., UV radiations), pigmentary preparations for imparting the desired shade or color, biocides an other secondary components.

Another known means for modifying the properties of the foam with integral skin, in particular, the thickness of the compact surface skin, comprises modifying the nature of the mold which is used for the formation of the foam, as well as the temperature of the mold. Various skin effects can be obtained by choosing a mold having a different thermal conductivity or by modifying the external temperature of the mold, e.g., by cooling the mold. It is possible to combine such means with those resulting from the use of specific catalysts, which have as purpose to accelerate the reaction, inside the mass which is under the process of foaming, to accelerate the reaction, thereby promoting the formation of the microcellular zone inside the product, whereas, at the outside, the integral skin reaches the desired thickness against the walls of the mold.

One can, therefore, see that there are many means for obtaining the desired physical characteristics, as they are mentioned hereinabove. It is essential that the foam with integral skin, constituting the final product, possesses the above-defined properties, so as to allow its use as external layer of the finished ball. Of course, one may obtain products having various characteristics by modifying not only the nature of the basic components (polyols, isocyanates, expansion agents, catalysts, chain-lengthening agents, foam stabilizers), but also by choosing various proportions of components in the mixture polyol-isocyanate, i.e., higher or lower relatively to the stoichiometry The proportions of this mixture depend on the nature of the polyol as well as of the nature of the isocyanate, particularly as concerns this last one as a function of the free NCO groups if, as preferred, a prepolymer is used.

All the general indications which have been given relatively to the production of polyurethane or polyurethane-polyurea foams with integral skin are well known by the persons skilled in the art. If need be, they may refer to the specialized literature in this technical field and especially to the following documents:

KUNSTSTOFF HANDBUCH BECKER/BRAUN Polyurethan 7-Herausgegebe von Prof. Dr. Gerhard W. BECKER, Berlin and Prof. Dr. Dietrich BRAUN, Darmstadt, Edition Hanser.

KUNSTSTOFF ADDITIVE 2 Ausgabe, herausgegeben von Dr. Reinhard Gächter und Dr. Helmut Müller, Basel, Edition Hanser.

These manuals of specialized technical literature are incorporated as references in the present disclosure.

Further details of the preferred embodiments of the invention are provided hereinbelow.

I—FOAMS OBTAINED FROM POLYESTER-POLYOL

COMPONENT A (1) Polyesterpolyol obtained by polycondensation of a dicarboxylic acid, as adipic acid, on a diol, as monoethyleneglycol, butane diol, diethyleneglycol and/or a triol, as trimethylolpropan;

(2) Chain-lengthening agent, chosen from the group of diols, such as monoethyleneglycol and butanediol;

(3) Catalyst, as a tertiary amine;

(4) Expansion agent, distilled water;

(5) Foam and cell dimensions stabilizer, e.g., chosen from the group of silicone oils;

(6) UV/antioxidant stabilizer, chosen from among the compounds having as a base benzophenone or benzotriazole;

(7) Biocide, constituted by an organic compound of arsenic;

(8) Pigmentary preparation, constituted by titanium imparting a white color.

COMPONENT B

Diisocyanate prepolymer obtained by the polyaddition of diphenylmethane 4,4'-diisocyanate and the polyester-polyol of Component A.

II—FOAMS OBTAINED FROM POLYETHER-POLYOL

For manufacturing balls according to the present invention, preference is given to such foams based on polyether-polyol, because they perfectly resist hydrolytic and cryptogamic degradations.

COMPONENT A (1) Polyether-polyol, resulting from the polymerization of ethylene oxide and/or propylene oxide;

(2) Chain-lengthening agent, selected from among diols, e.g., monoethyleneglycol or butanediol, and the diamines, e.g., diethyltoluene diamine (DETDA);

(3) Catalyst, constituted by a tertiary amine or an organic compound of tin;

(4) Expansion agent, constituted by distilled water or a fluorocarbon of the "FREON" type, e.g., "FREON Rll" or "FREON R123";

(5) Foam and cell dimensions stabilizer constituted, e.g., by silicone oils;

(6) UV stabilizer (or UV absorber)/antioxidant, constituted, e.g., benzophenone, benzotriazole, formamidine;

(7) Biocide, constituted, e.g., by an organic compound of arsenic;

(8) Pigmentary preparation, constituted, e.g., by titanium dioxide for imparting a white color.

COMPONENT B

Diisocyanate prepolymer obtained by polyaddition of diphenylmethane 4,4'-diisocyanate and of the polyether-polyol of Component A.

In the preceding description, indications have been given of systems with two components, but this way of presentation is not at all critical The person skilled in the art may use any formulation capable of foaming for producing a polyurethane foam having an integrated or integral skin. The Component A has been also prepared by introducing the polyol simultaneously with all the useful additives necessary for the expansion reaction, the Component B being then introduced separately. However, it is known that other forms of introduction may be used, e.g., by dividing the additives between Component A and Component B.

For obtaining articles as a foam with an integral skin, one may use any known technique available at the present time in this field. Apparatuses working under pressure and in closed circuit are already known. Components A and B are mixed by a proportioning or dosing head with a great precision and are injected in the mold. The reaction of foam formation is highly exothermic, the temperature in the heart of the product, which is under expansion, reaching possibly 130 to 180° C., and the pressure increasing up to about 7 bars/cm² inside the mold. It is, therefore, necessary to use a metallic mold device having a high closing power. As the temperature of the mold is a parameter which determines the thickness of the integral skin, the molding device is foreseen so to be able to moderate and very precisely regulate the external temperature of the mold.

By allowing one to use this known technique of injecting molding for obtaining foams with integral skin, the invention allows one to develop specific embodiments which are adapted to the manufacture of balls.

If the ball is to have a hand-sewn cover, it may be made by a method for making articles intended to be made of hand-sewn panels for the manufacture of balls and having an external layer of foamed plastic material with an integral skin, as defined hereinabove, characterized by including the steps of injecting a composition capable of foaming as in a mold cavity having the general shape of a plate, the thickness of which corresponds to at least twice the thickness of the panels to be obtained and is, for example, between about 3 and about 12 mm, withdrawing the plate, once molded, from the mold cavity, this plate having an integral compact skin on each of its faces or sides, cutting the plate substantially along its longitudinal median plane for obtaining two individual plates having each an external layer with integral skin and an internal microcellular side, gluing or cementing a textile complex or compound on the internal face of each plate, and cutting panels of the shape corresponding to the shape desired for the balls from each of the individual plates.

If an object of the invention is the manufacture of laminated balls which include an external layer in foam with integral skin, as defined hereinabove, the manufacturing method may include the steps of injecting a composition capable of foaming into a mold cavity having the general shape of a plate, the thickness of which corresponds substantially to at least twice the thickness of the panels to be obtained, e.g., of about 6 to about 12 mm, withdrawing the molded plated which has an integral compact skin on each side or face, cutting such molded plate substantially along its longitudinal median plane for obtaining two individual plates having each, an external layer with integral skin and a microcellular internal side, and cutting, from these individual plates, panels each having a shape which corresponds to the shape desired for the balls, these panels being directly usable for being applied on the internal inflated bladder structure of the ball.

Another embodiment of the ball may be manufactured by a method for obtaining balls by overmolding of a carcass, wherein the carcass is placed in a mold and, a composition capable of foaming is injected into the mold in order to obtain around the carcass an external layer of foam with an integral skin, as defined hereinabove. In this instance, the method includes the following steps:

(a) introducing a composition capable of foaming in an open mold having a shape corresponding substantially to the shape of half the ball to be manufactured, (b) introducing and locating in the mold the carcass to be overmolded and closing the mold by a countermold having exactly the shape of the carcass, (c) producing the expansion of the foaming composition for obtaining an external layer with integral skin on half of the carcass, (d) opening the mold, and (e) repeating the above-mentioned steps on the other half of the carcass, for obtaining the finished ball.

For obtaining panels adapted to the fabrication of hand-sewn or laminated balls, it is helpful to make flexible plates, by using a mold of reduced thickness, but which can have rather great dimensions, e.g., of 1×1 meter. The practical tests, which have been made, have shown that the best results were obtained with an injection molding apparatus allowing one to orientate vertically the mold, which has the shape of a plate, the injection point being provided at the lower part of the mold, thereby obtaining foams having perfectly homogeneous properties as concerns structure and density within the core.

For obtaining overmolded balls, the generally used injection molding technique has been modified so that, rather than injecting in the mold the composition capable of foaming, this composition is introduced previously in the mold, whereas, after placing the carcass to be overmolded and closing the mold, vacuum is applied for providing a regular repartition of the foam around the wall of the carcass. A technical example of such an apparatus is described thereafter as illustrative embodiment.

The overmolding can also be realized by the technique of injection in a closed mold using a proportioning or dosing head in a high or low pressure injection machine in closed circuit, a high pressure machine being preferred.

The invention is further described and illustrated, without any limitation, in the following detailed description with reference to the appended drawings in which:

Figure 1:
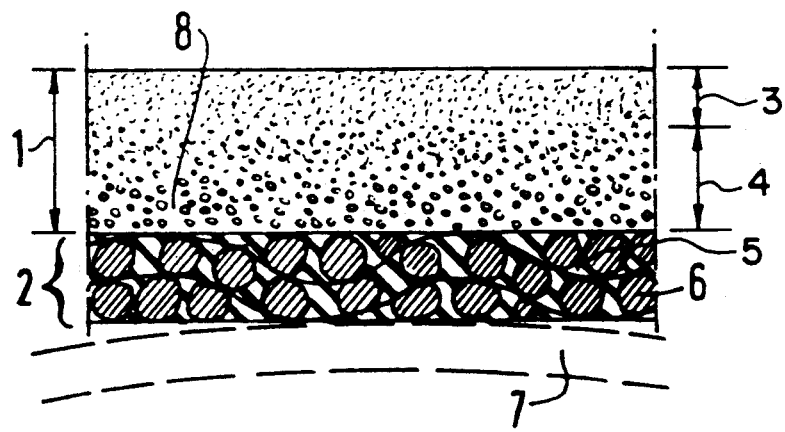
FIG. 1 is an enlarged scale fragmentary transverse cross-sectional view of a first embodiment of a sports ball embodying principles of the present invention.

DESCRIPTION OF THE PREFERRED EMBODIMENTS:

The structure shown in FIG. 1 is that of a ball of the hand-sewn type. Numeral 1 designates a cover constituted by a layer of foamed plastic material having an integral skin including, from the exterior to the interior, a compact skin 3 and a microcellular zone 4. In the illustrated example, skin 3 has a thickness of 0.5 to 1 mm and the microcellular zone 4 has a thickness of 2 to 3 mm. On the internal face of the cellular zone 4 is applied a complex or compound 2 formed of conventional technical fabrics 5, 6. Fabric 5 is applied on the microcellular face 4 by any gluing technique which is convenient. For example, with a foam 1 made of polyurethane, the gluing of fabric 5 may be accomplished by using a thermofusible polyurethane film having a polyether base. The technical fabric 6 has a crossed orientation relative to the fabric 5, the orientation being, for example, displaced by 90°. Complex 2 of technical fabrics may advantageously be saturated with natural latex for imparting a maximal duration of life to the ball. Such a structure may be associated in a known manner with an inflated bladder or bag 7, e.g., made of butyl rubber, mixed butyl-isoprene rubber or natural latex. Optimal characteristics are obtained, in particular, for avoiding the capture of water by the ball, by selecting a microcellular structure 4 wherein the cells are practically all closed. It may also be noted that, according to the invention, the external cover of the ball is monolithic 1, with a microcellular core 4 and a compact skin 3. The dimension and population of the cells 8 of the microcellular layer 4 decrease in the direction proceeding away from the interior, (i.e., the face turned towards the fabric 5), towards the exterior, so as to obtain compactness on the surface. In the example which is illustrated, a complex of technical fabrics is shown, formed by two fabrics 5, 6. However, it is, of course, to be understood that very different dispositions could be adopted as is well known by persons of ordinary skill in the art. Accordingly, a number of strengthening fabrics different from two, e.g., three or more fabrics, can be used. The best result has been obtained with fabrics constituted by mixture of 35% cotton and 65% polyester. The binding of these various textile layers between themselves is obtained with an adhesive having a latex base.

Figure 2:
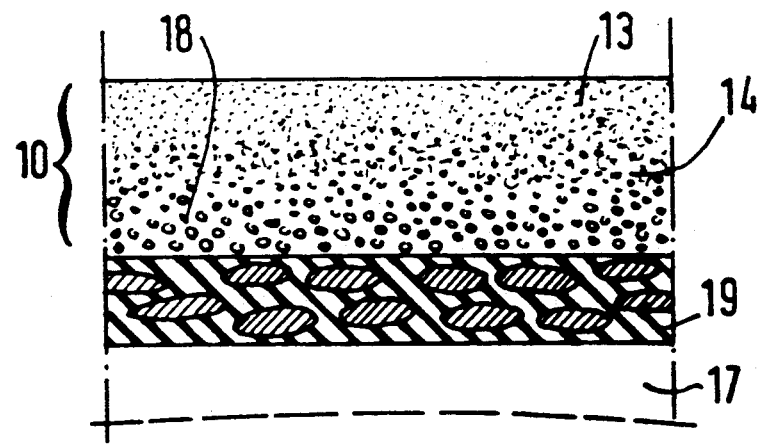
FIG. 2 is a similar view of a second embodiment thereof.

FIG. 2 shows the structure of a laminated-type ball made according to a second embodiment of the invention. The ball of FIG. 2 includes an external layer 10 constituted by a foam with integral skin, including an internal cellular zone 14 with cells 18 and a compact skin 13 on the surface. For constituting the ball of this embodiment of the invention, the best results have been obtained with a foam 10 made of polyurethane having about 3 mm thickness. In this type of ball, the external layer is constituted by a plurality of panels which are glued in a conventional carcass, which is illustrated on the drawings as including a bladder 17 with filamentary coating 19. This coating is advantageously constituted by a continuous filament made of "Nylon", more particularly, "Nylon 6,6", or in a polyester or a mixture, PES/P.A., allowing one to realize a multidirectional wrapping.

Bladder 17 may, in a known manner, be manufactured by using butyl rubber, butyl-isoprene rubber, a mixture of butyl and natural rubber or a mixture of butadiene and natural rubber. According to the example illustrated in FIG. 2, it appears that the panels 10 are directly glued on the internal structure (bladder 17 +coating 19). It has been observed that, with panels 10 made of polyurethane foam, an integral skin, a football is obtained, for example, which has the same response or "behavior" as a prior art hand-sewn football of high grade, but enjoying, compared to this prior art ball, a very long duration of life. Further, manufacturing costs of such a ball, according to the invention, are much lower.

Figure 3:
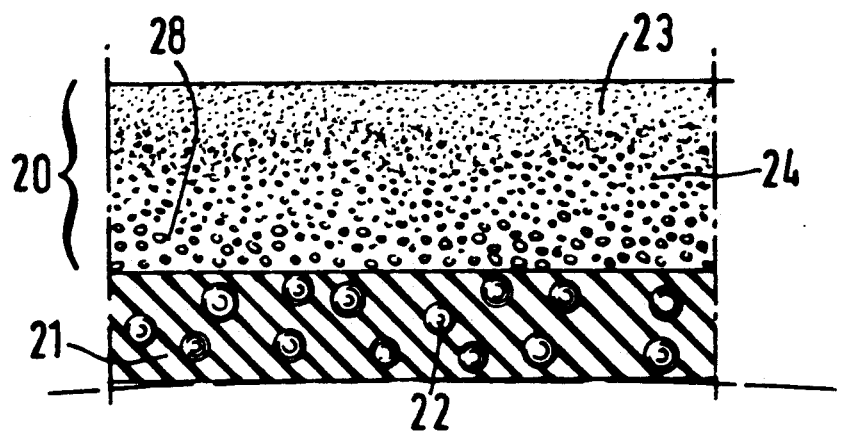
FIG. 3 is a similar view of a third embodiment thereof.

FIG. 3 shows a third embodiment of a ball according to the invention, the ball of FIG. 3 being of the overmolded type. For making such a ball, a conventional carcass 21 is directly overmolded with a foam 20 having an integral skin, which includes an internal cellular zone 24, with cells 28, and a compact skin 23 on the surface. Any type of carcass 21 can be used, e.g., a bladder made of butyl or butyl-isoprene rubber, with a filamentary coating, as explained hereinabove with reference to FIG. 2. However, one may also advantageously use a single-shell carcass, as illustrated in FIG. 3. For example, such a carcass may be manufactured by rotary molding. An example is a ball of the type having an internal single-shell carcass with an elastomer containing a filler constituted by at least one inorganic compound, the physical condition thereof providing a low density. It is advantageous that the carcass be made of a polyether-ester copolymer. The preferred filler is constituted by glass or silica as hollow microspheres 22 (FIG. 3) filled with air and resisting compression.

Described now, with reference to FIGS. 4 through 7, is a molding technique convenient for obtaining panels which can be used for forming the external layer of balls 20 having the structures which have been illustrated in FIGS. 1 and 2.

Figure 4:
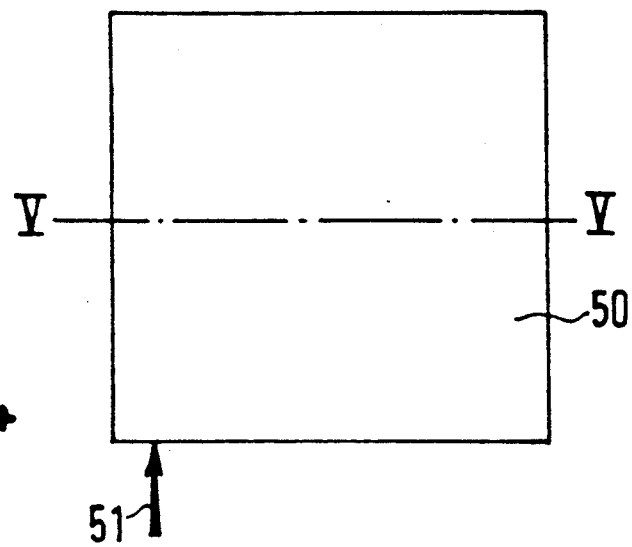
FIG. 4 is a front elevational view of a mold for molding plates that can be cut and medially cleaved to make gores or panels for fabricating a ball covering for a ball of the present invention.

FIG. 4 is a front view of a mold having, generally, a rectangular shape, e.g., 1.2×0.6 m. This mold 50 is vertically disposed and, at the lower part thereof, is provided with at least one point of introduction 51 for the composition capable of foaming.

Figure 5:
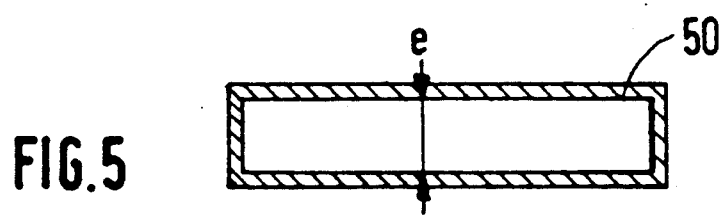
FIG. 5 is a transverse cross-sectional view of the mold taken on line V—V of FIG. 4.

FIG. 5 shows, in section, mold 50, the thickness e of which is equal to at least twice, e.g., 5 to 6 times, the thickness of the respective panels 1, 10 of FIGS. 1 and 2.

Figure 6:
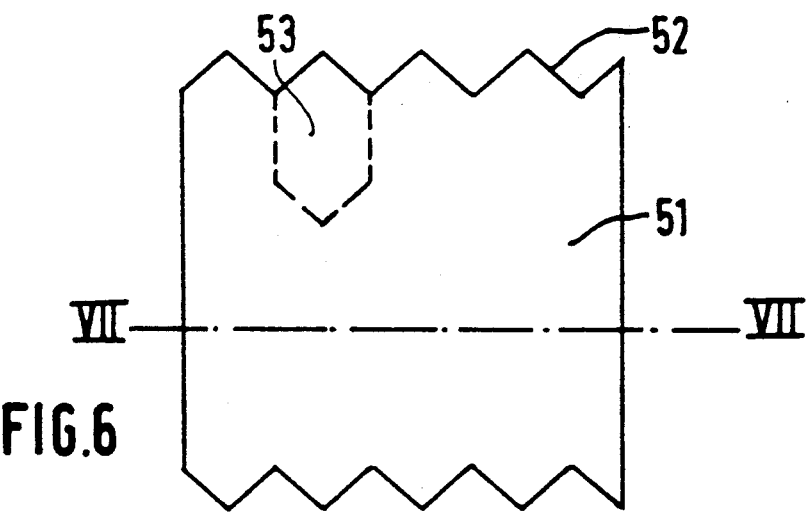
FIG. 6 is a plan view of a plate as molded in the mold of FIGS. 4 and 5, showing in dashed lines the outline of one panel unit to be cut therefrom.

FIG. 6 illustrates an advantageous embodiment wherein the molded plate 51 includes edges or lists 52 corresponding to the configuration of the panels 53 to be made. In the shown embodiment, these panels 53 have a generally hexagonal shape. This shape is advantageous because it allows one to reduce the lost material and to increase the production output.

Figure 7:
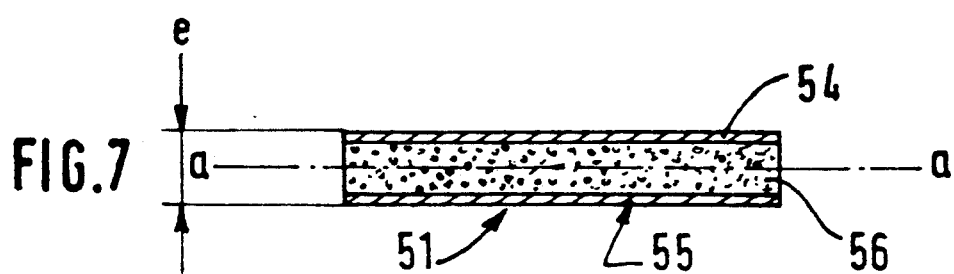
FIG. 7 is a thicknesswise cross-sectional view of the plate of FIG. 6, taken on line VII—VII of FIG. 6, and showing at a-a the cleavage plane for cutting the plate into two sets of panel precursors.
Figure 8:
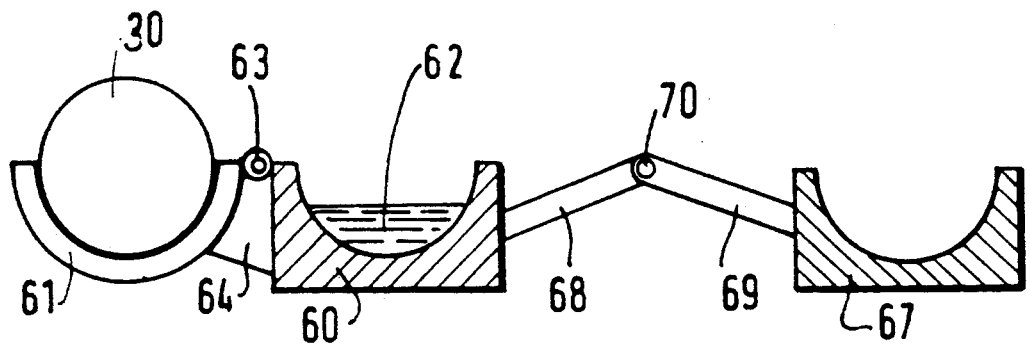
FIGS. 8-11 show successive steps in the manufacture of the FIG. 3 embodiment of the ball using an exemplary apparatus and method.

In FIG. 7 appears the structure, in section, of plate 51. Its thickness e corresponds to the thickness of the internal cavity of mold 50 (of FIG. 5). In each of its sides or faces 54, 55, plate 51 has a compact skin, whereas the internal zone 56 thereof is of the microcellular type, according to the teaching of the present invention. For obtaining unitary plates adapted to be used for making panels of the type illustrated as panels 1, 10 in FIGS. 1 and 2, the plates 51 are cut substantially along their longitudinal median plane aa. With a mold 50 of 1.2×0.6 m, one may obtain by this method 1.44 m² of material with integral skin, adapted for the manufacture of the panels.

Panels which are convenient for making balls of the laminated type (FIG. 2) may, therefore, be directly made, after cutting, trimming or sizing of the edges, serigraphic marking, for being glued on the internal carcass. For obtaining hand-sewn balls (of the type shown in FIG. 1), molding plates on a foam with integral skin are overglued with complexes in technical fabrics before proceeding with the cutting by punching or stamping and to the serigraphic marking. The final step for making the ball comprises assembling the different panels by manual sewing.

FIGS. 8 through 11 illustrate a method of manufacture which is adapted for obtaining overmolded balls. This type of ball has been illustrated in FIG. 3, in an illustrative manner. The tool system illustrated in FIGS. 8-11 is normally used for obtaining round balls, but could be adapted for obtaining balls of other shapes. This tool system includes a first portion of mold 60 having an internal cavity with a dimension corresponding substantially to half the volume of the ball to be made. A lid or cap 61, movable around a hinge 63, is also provided, this lid having also an internal volume which corresponds substantially to half the volume of the ball. Means 64 allow one to secure, in a removable manner, lid 61 on mold 60. In the first step of the process, illustrated in FIG. 8, carcass 20 to be overmolded, which has been premanufactured, is initially located inside lid 61, as shown. Then, one places inside mold 60 a quantity of a composition 62 capable of foaming, which corresponds to the quantity necessary for realizing the external layer of half the ball.

Figure 9:
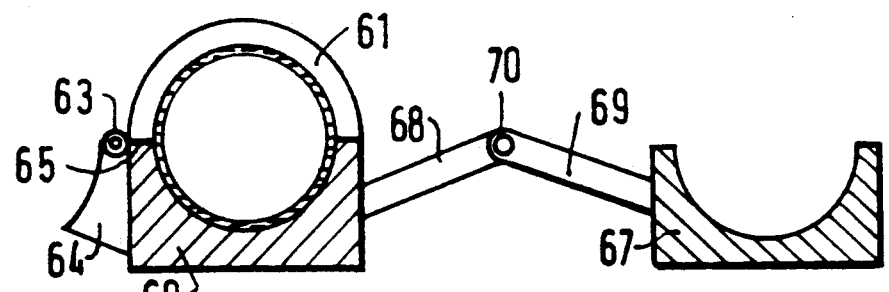

In a second step, illustrated in FIG. 9, the mold 60 is closed by cover 61. A fluid-tight joint 65 is disposed between the two portions of the mold. In order to ensure a homogeneous repartition as well a the application of composition 62 around the lower hemisphere of the ball, vacuum is applied inside the mold by any appropriate means not shown. In a following step, lid 61 is opened thereby reaching the disposition shown on the left part of FIG. 10. The lower hemisphere of carcass 30 is then covered by an external layer 66 in foam with an integral skin.

Figure 10:
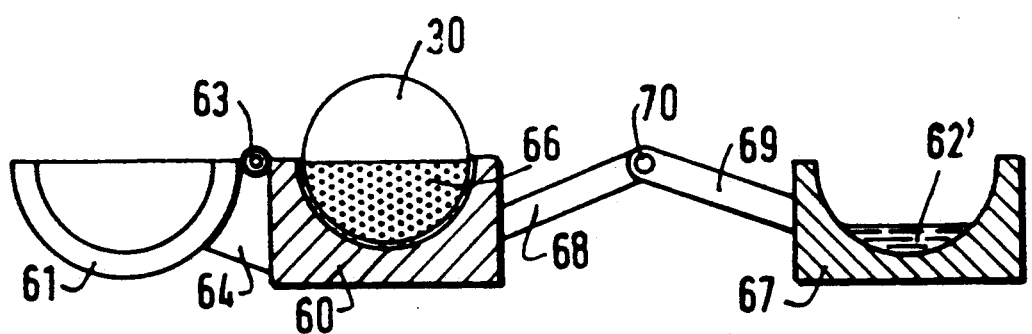
Figure 11:
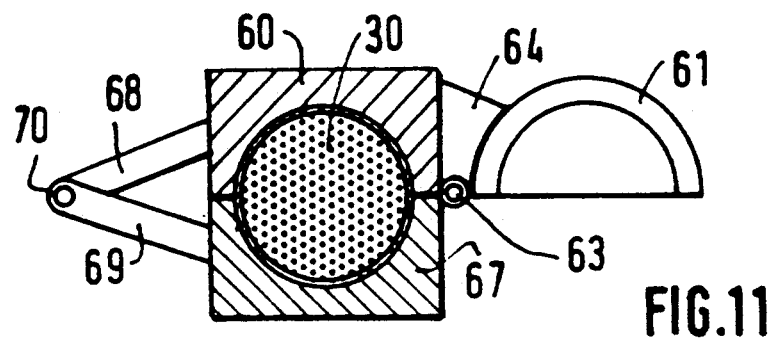

Further, the tool system also includes another mold 67 identical to mold 60. In particular, its internal cavity has a volume corresponding substantially to the volume of half the ball to be manufactured. Once the configuration shown in FIG. 10 is reached, a quantity 62' of the same composition capable of foaming, as the composition 62 used precedently in mold 60, is introduced in mold 67. Then, mold 60 will be used as counter mold for closing mold 67, thereby reaching the configuration shown in FIG. 11. Therefore, the link between molds 60 and 67 must be realized by any means allowing the application, one against the other, of the two portions of the mold. The drawings illustrate a way of obtaining these results with a system of bars 68, 69 hingedly linked at 70 and connected respectively to half-molds 60 and 67. For reaching the position shown in FIG. 11, it suffices to rock, around the hinge of joint 70, the whole mold 60 with its lid 61 (which is then open). For obtaining the overmolded final ball, it is convenient to apply vacuum inside the mold constituted by the two half-molds 60 and 67. In this manner, the composition 62' capable of foaming is distributed around the superior hemisphere of carcass 30 for constituting the external layer of foam with an integral external skin. It suffices afterwards to open the mold for obtaining the position of the tool system illustrated in FIG. 8. The finished ball is then of the type generally illustrated in FIG. 3.

The overmolding may also be realized by injection in a closed mold by a dosing head of a high or low pressure injection machine with a closed circuit.

It may be noted that although the preceding disclosure deals with the making of an overmolded ball with a single-shell carcass, the same method may also be applied by the direct overmolding of conventional carcasses including a bladder in butyl or butyl-isoprene rubber with a multidirectional filamentary coating. In all cases, the foaming composition is sufficiently reactive for adhering on the carcass without needing an adhesive.

The foams with integral skin made of polyurethanepolyurea impart to the manufactured ball an exceptional longevity. The person skilled in the art will easily understand that the manufacturing process illustrated in FIGS. 8 through 11 has a clear economic advantage over the process which comprises sewing or gluing, one by one, the panels.

It ma also be noted that the invention is applicable for obtaining balls of any type and for all uses, e.g., for outdoor sports or indoor sports, for leisure, the shape of the ball being also indifferent.

The present invention is further illustrated hereinbelow by detailed examples for obtaining sports balls having inflated bladders covered by a layer of polyurethane-polyurea foam with an integral skin.

EXAMPLES 1 to 6

In the following examples, polyurethane or polyurethane-polyurea foams with integral skin have been prepared starting from polyester-polyol. A system with two components has been used, i.e., a component A containing the polyester-polyol and all the components of the composition except the isocyanate component, and a component B constituted by said isocyanate. The operational parameters are the following:

Proportions of the mixture A/B: 80/100 to 126/100 by weight.

| Temperatures when used: | |
| --- | --- |
| Component A | 50° C. |
| Component B | 40° C. |
| Mold temperature: | 40 to 50° C. |
| Reaction Speed: | |
| Start of reaction | 6 to 10 s |
| Expansion duration | 30 to 35 s |
| Reaction duration | 35 to 40 s |
| Total presence duration in the mold: | 2.5 to 5 minutes |
| Viscosity of the components when used: | |
| Component A | 1200 cps |
| Component B | 850 cps |

EXAMPLE 1

Component A, which was used, had the following composition:
polyester-polyol: 84.39% parts by weight This polyester-polyol was the product available on the market under the trademark "Estolan P 201" from Lankro Corporation and had the following composition and characteristics:

| Butanediol 1.4 (chain-lengthening agent) | 11.5% parts by weight |
| --- | --- |
| Catalyst ( DABCO (amine) | 0.59% parts by weight |
|        ( POLYCAT 41 | 0.040% by weight |
| Expansion agent: distilled water | 0.38% parts by weight |
| Cells controlling agent: | 0.25% parts by weight |

This agent was a silicone oil available from Dow Corning.
UV radiation absorber: 1.15% parts by weight
The absorber was the product available from Ciba Geigy resulting from the mixture of three UV absorbers in the following ratio:
"Tinuvin P": 2
"Tinuvin 765": 2
"Irganox 245":
Biocide: 0.70% parts in weight.
It was a product available from Morton Thiokol under the trademark "Vinyzene BPS 2 PG".
White pigment (titanium dioxide): 1 part by weight.

All of the above-mentioned ingredients have been mixed for obtaining a single formulation allowing to realize component A of the two-component system intended for forming the polyurethane-polyurea foam.

Component B is an isocyanate prepolymer available from Lankro under the trade name B 3001.

Components A and B have been mixed in the proportion of 115 parts of component A for 100 parts of component B, according to the general processing method indicated previously.

In this manner, a foam of polyurethane-polyurea with integral skin, adapted to embody the invention for manufacturing balls has been obtained.

EXAMPLE 2

Similar results have been obtained by replacing in component A, the Estolan P 201 polyol by Estolan P 179 polyester-polyol of Lankro using an equivalent weight quantity.

EXAMPLE 3

Similar results as the ones obtained in preceding Examples 1 and 2 have been obtained by substituting, in component A, to butanediol 1.4, used as chain-lengthening agent, monoethyleneglycol in an equivalent weight quantity.

EXAMPLE 4

Results similar to the results obtained hereinabove have been obtained by substituting, in component A of preceding Examples 1 to 3, to DABCO amine catalyst, one of the followinq catalysts in equivalent weight proportion, these catalysts having the nature and the characteristics indicated hereunder and being available from Air Products and Chemicals (USA).

Polycat 41
Liquid catalyst with a basic pH
Density: 0.91–0.95 at 25° C.
(Brookfield) viscosity 26 5 cps at 38° C.
Vapor pressure: 0.1 mmHg at 141° C.
Flash point in closed turret (ASTM D 56–70): 104° C.
Polycat SA 102:
Liquid catalyst
Density: 1.017 at 25° C.
Boiling temp.: 291–292° C.
Solidification temp.: 1–2° C.
(Brookfield) viscosity: 3749 cps at 25° C.
Vapor pressure: 2.1 mmHg at 38° C.
Flash point in closed turret: higher than 94° C.

EXAMPLE 5

Results similar to those obtained in preceding Examples 1 to 4 have been obtained by substituting, in formulation of component A, to "Tinuvin P", as UV absorbing agent, the equivalent parts of the following products:
"Tinuvin 765": 2
"Tinuvin P": 2
"Irganox 245": 1

EXAMPLE 6

Results similar to those of preceding Examples 1 to 5 have been obtained by substituting, in component A, to DC 193, as cell control agent, an equivalent weight quantity of LK 221 cell controller available from Air Products.

EXAMPLE 7 to 14

In the following examples, polyurethane-polyurea foams with integral skin have been obtained starting from polyether-polyol foams, which are very useful for manufacturing balls.

The general working parameters of these examples are the following:

Proportion of the mixture A/B 80/100 to 110/100, by weight.

| Temperatures when used: | |
| --- | --- |
| Component A | 35° C. |
| Component B | 35° C. |
| Temperature of the mold: | 40-50° C. |
| Reaction speed: | |
| Start of reaction: | 10-15 s |
| Expansion duration: | 30-35 s |
| Reaction duration: | 35-45 S |
| Total presence period: in the mold: | 2.5 to 5 mn |
| Viscosity of the components when used: | |
| Component A at 35° C. | 600 cps |
| Component B at 35° C. | 630 cps |

EXAMPLE 7

A component A with the following composition has been prepared:

Polyether-polyol: 85.0 parts in weight.
It was "Propylan D 4012" available from Lankro.
Chain-lengthening agent (butanediol 1.4: 9.5 parts by weight)
(10.9 parts by weight in (DETDA: 1.4 parts in weight total
Catalysts { 0.35 "DABCO"
0.050 "Polycat 41" } parts by weight
0.080 "Fomrez UL 32"
Expansion agent: 0.70 parts by weight.

In this example, a chemical expansion with water has been performed.

| UV absorber: mixture of | |
| --- | --- |
| "TINUVIN P"<br>"TINUVIN 765"<br>"IRGANOX 245" | 1.15 parts in weight |

In fact, any one of the above-mentioned products TINUVIN P, TINUVIN 765 or IRGANOX 245 (antioxidant).
Cells controller: 0.25 parts by weight.
In fact, any one of the products DC 913 or LK 221, defined previously.
Biocide: 0.500 parts by weight.
In fact, the Vinyzene BP 5 2 PF, defined hereinabove.
Pigment: titanium dioxide (white pigment): 1.0 parts by weight.

To 107 parts by weight of this component A, were added by mixing 100 parts by weight of an isocyanate consisting of "Quasilan RB 1384" available from Lankro, as an isocyanate prepolymer.

By this method, polyurethane-polyurea foams with an integral skin, advantageously usable for forming external layers for balls, have been obtained.

EXAMPLE 8

Results similar to those of preceding Example 7 have been obtained by replacing, in component A of this example, Propylan D 4012 polyether-polyol by an equivalent weight proportion of the polyether-polyol available under the trade name "Propylan M 111" from Lankro.

EXAMPLE 9

Results similar to those of preceding Examples 7 and 8 were obtained by substituting, in the composition of component A, to butanediol 1.4, as chain-lengthening agent, an equivalent weight quantity of monoethyleneglycol.

EXAMPLE 10

Results similar to those of preceding Examples 7 to 9 have been obtained by using, in the composition of component A, as chain lengthening agent, the diamine product available under the trade name "DETDA" from Ethyl Corporation, having the following characteristics:

| Liquid product: | |
| --- | --- |
| Molecular weight: | 178.28 |
| Density: | 1.022 g/cm$^3$ at 20° C. |
| (Brookfield) viscosity: | 326 cps at 20° C. |

EXAMPLE 11

Results similar to those of preceding Examples 7 to 10 have been obtained by substituting to the catalyst DABCO, in the composition of component A, equivalent weight quantities of catalysts Polycat 41 and Polycat SA 102 as hereinabove defined.

EXAMPLE 12

Results similar to those of preceding Examples 7 to 11 have been obtained by using as a catalyst, an organic compound having a tin base, available under the trademark "Fomrez UL 32" from Witco, having the following characteristics:

| Liquid product | |
| --- | --- |
| Density: | 0.97 g/cm$^3$ |
| Vapor pressure: | 1 mmHg at 20° C. |
| Flash point (UDED method): | 205° C. |

EXAMPLE 13

Results similar to those of Examples 7 to 12 have been obtained by using as expansion agent another chlorofluorated derivative of methane combined with water, i.e.:

| 0.40 H$_2$O<br>5.000 Frigon 11S ("Freon") | parts by weight |
| --- | --- |

A semichemical and semiphysical expansion process is used.

EXAMPLE 14

Results similar to those of preceding Examples 7 to 13 have been obtained by using, as expansion agent, an equivalent weight quantity of distillated water.

The above-mentioned values have been given only as a indication for guiding the person skilled in the art, but many modifications in the formulation may be made for obtaining polyurethane or polyurethane-polyurea foams which are convenient for embodying the present invention.

It has been practically ascertained that the use of polyurethane foams with integral skin, as an external layer for sports balls imparted to these balls many advantages. The balls obtained with these foams have simultaneously the optimal qualities which are desirable for such products, i.e.:

1) Compressibility due to the microcellular layer, thereby imparting an excellent grip to the ball (flexible, agreeable to the hit) when touching the ball and facility technical work of the ball; the control of the displacement of the ball and of the distance of the course are made easier.

2) Structure of the major part with closed cells: thereby allowing a very reduced capture of water and a very reduced modification of weight during rainy weather (resulting from an excellent fluid-tightness).

3) Elasticity and memory when shooting at a great distance; the ball has exceptional resources.

4) Excellent stability in presence of cold conditions; therefore, only small modifications of hardness as function of the temperature; the ball maintains its flexibility and qualities during winter.

5) Good surface smoothness, the flow of air being substantially laminar along the surface of the ball when shooting at high speed.

6) Very high resistance to wear, to scorching and to cutting; the balls made in accordance with the principles of the present invention give excellent results as concerns their durability, results which have not been obtained until now.

7) Excellent resistance to hits and impacts and to fatigue under repeated flexions.

8) No hydrolytic or microbiologic degradations.

9) High chemical affinity with the various serigraphics ink systems, thereby facilitating the external decorations of the balls; the serigraphics impressions (systems based on polyurethane are preferred for this purpose), due to their great chemical affinity, show an unequaled lifetime when compared to other usual materials which are used for making balls.

10) Possibility of imparting any colours (even fluorescent colours) and surface reliefs (various grains imitating natural leather or specific profiles for improving the surface grip, Reynolds number, etc.).

11) Excellent multidirectional lengthening symmetry allowing one to obtain very spherical balls with a good reproducibility, even in case of industrial manufacture.

As various changes could be made without departing from the scope of the invention, as defined in the following claims, it is to be understood that the preceding description should be interpreted as illustrative and not in a limiting sense.

We claim:

1. An inflated bladder-type sports ball, comprising:
wall means defining an inflated bladder having an external surface;
a cover supported on said external surface and enclosing said inflated bladder; said cover comprising a layer of synthetic plastic material having a substantially uniform thickness, said layer including an inner core portion which is foamed, and an external skin, integrally provided on said core portion, said skin being substantially non-foamed;
said synthetic plastic material of core portion and skin being made of polyurethane or a copolymer of polyurethane and polyurea;
said layer as a whole being between 1.5 and 5 mm thick, said core portion being between 1.0 and 3.0 mm thick and said skin being between 0.5 and 2 mm thick.

2. The sports ball of claim 1, wherein:
said layer of synthetic plastic material has an average density of between 0.4 and 0.6 $g/cm^3$, said core portion has an average density of between 0.4 and 0.6 $g/cm^3$, and said skin has an average density of between 0.3 and 0.9 $g/cm^3$, and said skin has an average density of between 0.9 and 1.2 $g/cm^3$.

3. The sports ball of claim 1, wherein:
said core has a microcellular structure constituted by a three-dimensional array of cells most of which are isolated from open intercommunication with one another.

4. The sports ball of claim 1, wherein:
layer of synthetic plastic material is provided as a plurality of individual pieces each having an outer peripheral edge; all of said pieces being sewn to one another marginally of said edges.

5. The sports ball of claim 4, wherein:
said pieces are hexagonal in outer peripheral shape.

6. The sports ball of claim 1, further comprising:
at least one layer of woven textile fabric interposed between external surface of said inflated bladder and said core portion of said cover.

7. The sports ball of claim 1, further comprising:
a plurality of layers of woven textile fabric arranged upon one another so as to have weft directions which cross one another, and being interposed between said external surface of said inflated bladder and said core portion of said cover.

8. The sports ball of claim 1, further comprising:
a multidirectional winding of continuous filamentary material interposed between said external surface of said inflated bladder and said core portion of said cover; and a layer of adhesive gluing said core portion of said cover, through said filamentary material, onto said external surface of said inflated bladder.

9. The sports ball of claim 8 wherein:
said layer of synthetic plastic material provides an integrally molded covering on said inflated bladder.

10. The sports ball of claim 1, wherein:
said bladder is made of rubbery material.

11. The sports ball of claim 10, wherein:
said rubbery material includes a filling of hollow microspheres made of glass or silica.

12. The sports ball of claim 10, wherein:
said layer of synthetic plastic material provides an integrally molded covering formed directly upon said external surface of said bladder.

* * * * *